June 2, 1953  W. A. BLANCHARD  2,640,504
CHAIN DRIVE FOR LOOM SHEDDING MECHANISM
Filed Sept. 23, 1950  2 Sheets-Sheet 1
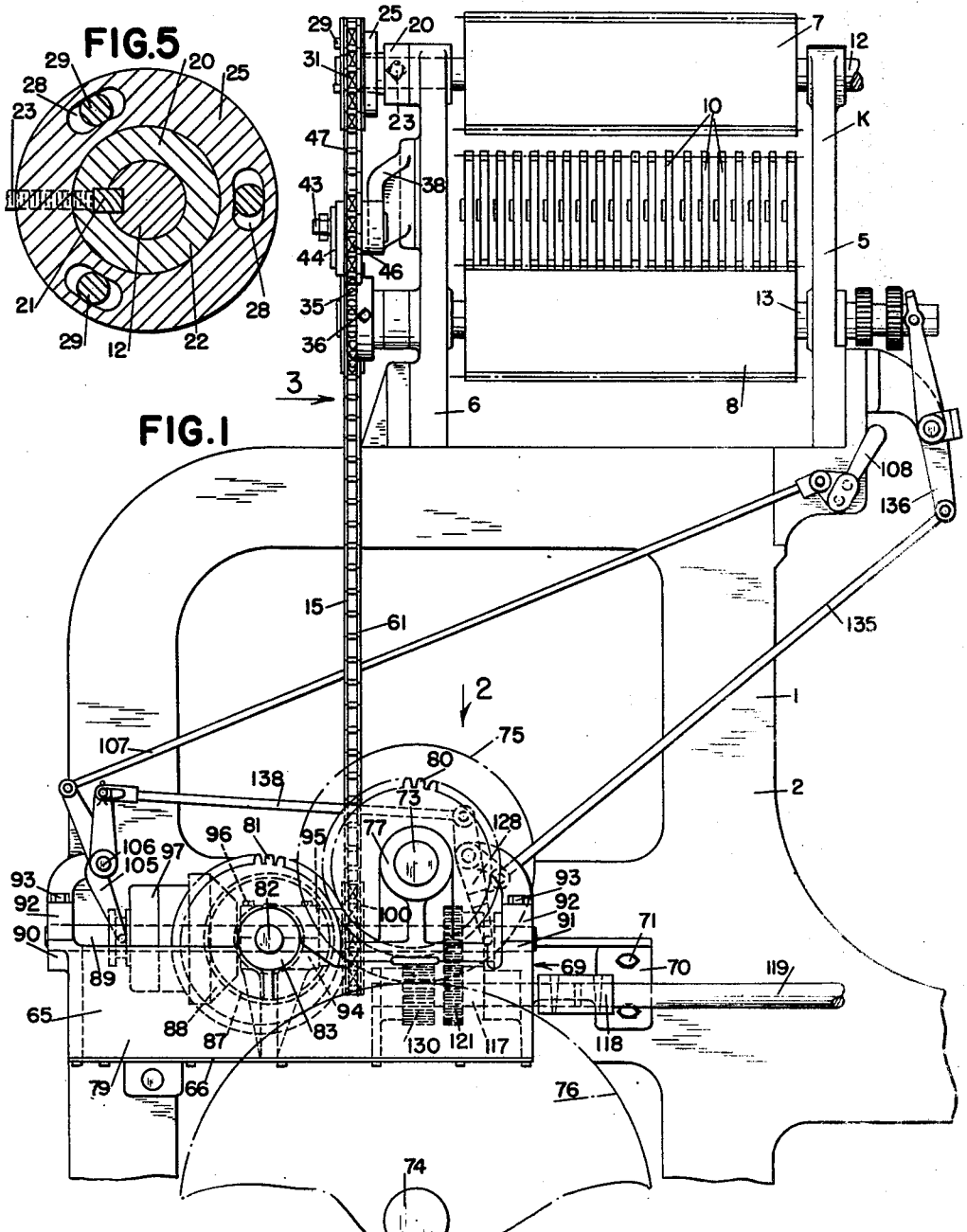
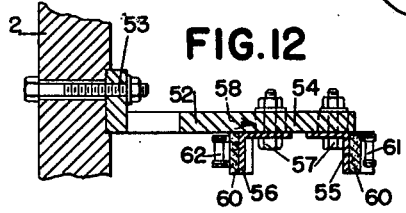
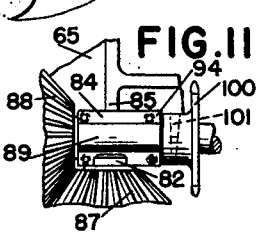
INVENTOR
WILLIAM A. BLANCHARD
Chas. T. Hawley
ATTORNEY.

June 2, 1953  W. A. BLANCHARD  2,640,504
CHAIN DRIVE FOR LOOM SHEDDING MECHANISM
Filed Sept. 23, 1950  2 Sheets-Sheet 2
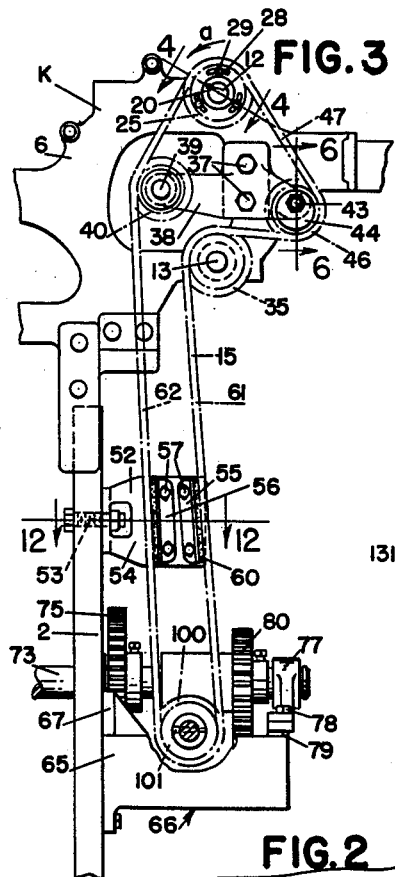
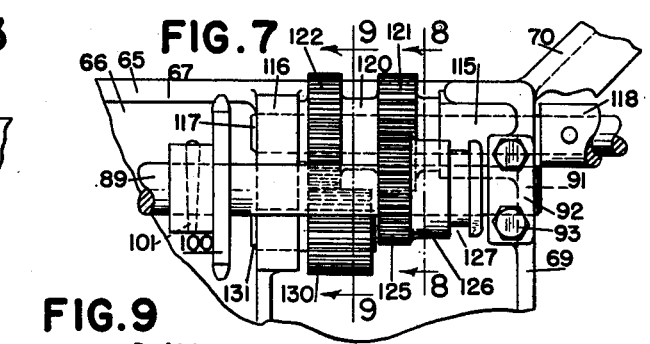
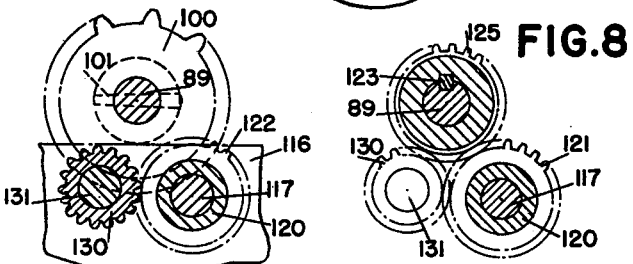
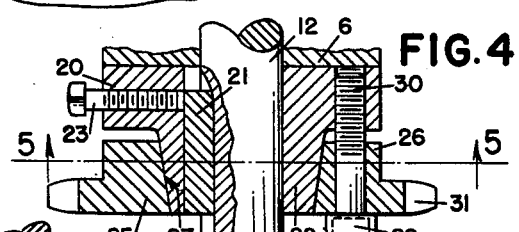
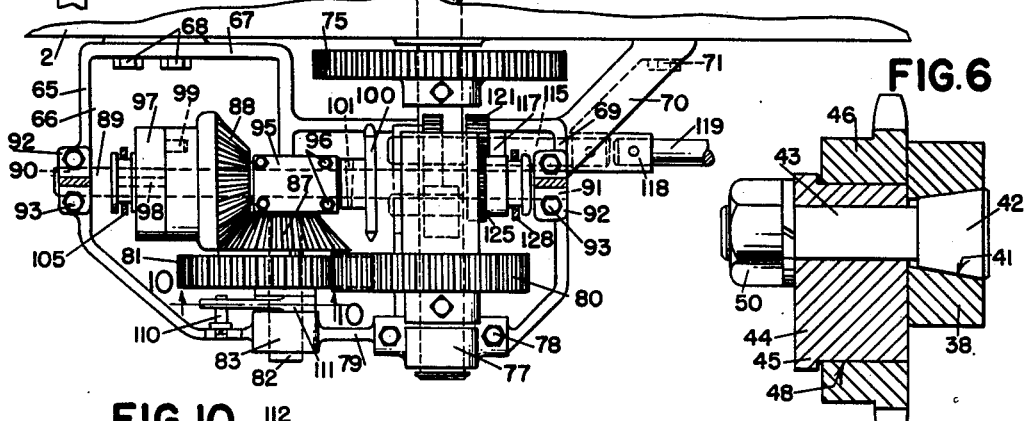
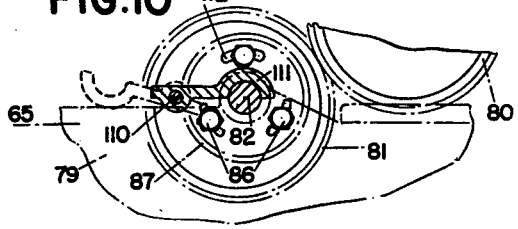
INVENTOR
WILLIAM A. BLANCHARD
Chas. T. Hawley.
ATTORNEY Patented June 2, 1953

2,640,504

UNITED STATES PATENT OFFICE 2,640,504

CHAIN DRIVE FOR LOOM SHEDDING MECHANISM

William A. Blanchard, Millbury, Mass., assignor to Crompton & Knowles Loom Works, Worcester, Mass., a corporation of Massachusetts Application September 23, 1950, Serial No. 186,461

25 Claims. (Cl. 139—1)

This invention relates to improvements in warp shedding mechanisms for looms more particularly of the type employing rotating actuators and it is the general object of the invention to provide improved driving means for the actuators.

A well-known shedding mechanism for looms employs two oppositely rotating elongated gear cylinders between which are located vibrator gears mounted on vibrator levers the vertical position of which is determined by the pattern chain. The vibrator gears are attached by connectors to harness frame lifting jacks. When a vibrator lever is raised its vibrator gear is turned in one direction by the top cylinder gear and when the vibrator lever is lowered its gear is turned in the opposite direction by the lower cylinder gear. The opposite rotations of the cylinder gear cause rocking of the harness jack to raise and lower the harness frames.

In the past the cylinder gears have been driven by an upright shaft having beveled gears secured thereto to mesh with beveled gears on the cylinder gears and the lower end of the shaft has been driven by one or another of the shafts of the loom by bevel gears. Because of the rigidity of the shaft its driving connections with the cylinder gears and the loom shaft must be accurately fitted to avoid undesirable wear and breakage.

It is an important object of the present invention to provide a flexible driving means between the cylinder gears of the shedding mechanism and the loom shaft from which power is derived to rotate the cylinder gears. This flexible connection may conveniently take the form of an endless chain trained over sprocket wheels secured to the cylinder gears.

In order that the previously mentioned vibrator gears may be reversed the cylinder gears turn in opposite directions and it is a further object of the invention to train the driving chain around the sprocket wheels of the cylinder gears in such manner that the latter will be rotated in opposite directions.

Chains have a tendency to stretch in use and it is the further object of the invention to provide a slack taking up means by which the chain can be kept taut. This means may take the form of an eccentric mounting for an idler guiding sprocket wheel for the chain.

When the slack take-up mechanism is adjusted to tighten the chain there is likelihood that one or another of the cylinder gears may be moved and become improperly timed relative to the other cylinder gear due to motion of the chain. In order to compensate for this movement it is a further object of the invention to provide an adjustable drive means between at least one of the cylinder gears and its sprocket wheel so that the cylinder gears may be kept in proper time.

It is another object of the invention to direct opposite sides of the chain along guides or the like which can be adjusted to prevent vibration of the chain and also take up a certain amount of slackness in the chain.

The axes of the cylinder gears are parallel and horizontal and in order that the chain for driving the cylinder gears may move in a plane it is a further object of the invention to provide a loom driven shaft having its axis horizontal and substantially parallel to the cylinder gears and mount the driving sprocket wheel for the chain on the horizontal shaft.

It is a further object of the invention to provide a housing or casing on which the major part of the mechanism is mounted, this housing permitting assembly of the driving mechanism for the chain apart from the loom. After this assembly has been completed the housing can then be bolted to the loom and since there is some flexibility in the chain it is not necessary to have the housing and its bearings as accurately set as has been necessary heretofore when the previously mentioned upright shaft was used.

Many looms equipped with the type of shedding mechanism already described employ a positive worm take-up mechanism for the cloth. This mechanism includes a horizontal shaft with provision for its reversal when a pick-out is made in the cloth. It is a further object of the invention to provide a simple form of reversing mechanism between the take-up shaft and the horizontal loom driven shaft which carries the driving sprocket wheel.

With these and other objects in view which will appear as the description proceeds, the invention resides in the combination and arrangement of parts hereinafter described and set forth.

In the accompanying drawings, wherein a convenient embodiment of the invention is set forth, Fig. 1 is a side elevation of part of the loom having the invention applied thereto, Fig. 2 is a plan view looking in the direction of arrow 2, Fig. 1, Fig. 3 is a rear elevation on a reduced scale looking in the direction of arrow 3, Fig. 1, the structure at the lower part being broken away and the horizontal shaft for driving the shedding mechanism being shown in section, Fig. 4 is an enlarged detail longitudinal section on line 4—4, Fig. 3, Fig. 5 is a vertical section on line 5—5, Fig. 4, Fig. 6 is an enlarged detail vertical section on line 6—6, Fig. 3, Fig. 7 is a view on an enlarged scale similar to a part of Fig. 2 but showing the reversing mechanism for the takeup, Figs. 8 and 9 are vertical sections on lines 8—8 and 9—9, respectively, Fig. 7, Fig. 10 is a detailed vertical section on line 10—10, Fig. 2, showing the retainer in two positions, Fig. 11 is a detail view similar to a part of Fig. 2 but with the cap for the bearing of the horizontal loom driven shaft removed, and Fig. 12 is an enlarged detail horizontal section on line 12—12, Fig. 3.

Referring more particularly to Figs. 1 and 3, the loom frame designated generally at 1 includes a loomside 2 on the upper part of which is mounted a shedding mechanism designated generally at K. This mechanism is of the well-known Knowles head type and includes front and back plates 5 and 6 which support top and bottom cylinder gears 7 and 8, respectively. These cylinder gears are mounted for rotation in bearings provided on the plates 5 and 6 and are preferably located one over the other. Between the cylinder gears 7 and 8 is a set of vibrator gears 10 mounted on vibrator lever 11 the vertical position of which is determined by a pattern chain mechanism (not shown). The cylinder gears 7 and 8 rotate in opposite directions, the top cylinder rotating in the direction of arrow a, Fig. 3. The top and bottom cylinder gears 7 and 8 are secured to shafts 12 and 13, respectively, which are parallel and horizontal and extend in a back and forth direction in the loom.

The matter thus far described may be of common construction as shown more particuluarly in prior Patents Nos. 134,992 and 506,818.

The top and bottom cylinders 7 and 8, are driven by an endless flexible actuator, such as a chain 15, which is trained over sprocket wheels to be described. The top cylinder shaft 12 has collar means 20 keyed thereto as at 21 and formed with a conical part or cone 22. A set screw 23 holds the key in position and the key causes the collar 20 to rotate with the shaft 12. A driven sprocket wheel 25 has a hub 26 formed with a conical bearing 27 which fits the cone 22. The sprocket wheel is provided with arcuate slots 28 concentric with the axis of shaft 12 to receive securing means such as draw screws 29 which are tapped as at 30 into the collar 20 and acting when tightened to hold the sprocket wheel securely on the cone. The sprocket wheel 25 has teeth 31 which mesh with the chain 15. By loosening the draw screws 29 the sprocket wheel 25 can be turned for angular adjustment around the cone 22, after which the draw screws are tightened to hold the sprocket wheel in adjusted position on the cone.

The shaft 13 has a driven sprocket wheel 35 which meshes with the chain 15. This sprocket wheel 35 is preferably secured to the shaft 13 as at 36 without means for angular adjustment, although the adjustment described in connection with the sprocket wheel 25 can be used if desired.

Bolted to the rear frame plate 6 as at 37 is a stand 38 the rear end of which carries a stud 39 on which is rotatably mounted an idler sprocket wheel 40 meshing with the chain 15. The forward part of stand 38 is formed with a conical bore 41, see Fig. 6, which receives a conical head 42 of a stud 43 extending through an eccentric 44. The latter has a rim 45 between which and the stand 38 is located a slack take-up or chain tightener sprocket wheel 46 meshing with section 47 of chain 15 extending between sprocket wheels 25 and 35. The sprocket wheel 46 rotates freely on the cylindrical surface 48 of the eccentric. This latter surface is eccentric with respect to the axis of stud 43 and by loosening a clamping means such as nut 50 on the stud the eccentric can be turned angularly around the stud 43 to effect bodily movement of the sprocket wheel 46 in a direction away from a line joining shafts 12 and 13 to take up slack in the chain.

As shown more particularly in Fig. 3 the loom is provided with means for preventing vibration of the chain 15 and also for serving to some extent at least as a chain tightener. A stand 52 bolted to the loomside 2 as at 53 has an outwardly extending plate 54 to which are secured outer and inner angle iron elements 55 and 56, respectively. These angle irons are held in position by bolts 57 which pass through horizontal slots 58 in the plate 54. The angle irons have secured thereto strips 60 of anti-friction material, such as hard fiber, which engage the inner sides of the two substantially parallel sections 61 and 62 of the chain 15. If slackness develops in the chain due to stretching the angle irons can be moved away from each other to take up the slack of the chain. The two sections 61 and 62 will move along the anti-friction plates 60 and be held by the latter against undue vibration of the loom.

The lower part of the loom is provided with a housing or casing of box-like form indicated generally at 65. This casing has a floor 66 and walls extending upwardly from the floor. One of these walls shown at 67 may be secured as at 68 to an adjacent part of loomside 2, while another of the walls 69 may be formed with an arm 70 which is seecured as at 71 to another part of the loomside 2.

The loom has top and bottom shafts 73 and 74, respectively, connected by gears 75 and 76 which are in such ratio as to cause two rotations of the top shaft for each rotation of the bottom shaft. This particular ratio, however, is not essential to the present invention.

The top shaft 73 passes through a bearing 77 secured as at 78 to an outer wall 79 of the housing 65. Secured to shaft 73 is an eccentrically mounted spur gear 80 meshing with the second eccentrically mounted spur gear 81 of the same size rotatable on a mounting means such as stud 82. The latter has its outer end held in a hub or bearing 83 formed preferably as part of the casing 65 and has its inner end supported in a half bearing 84 formed in a horizontal bearing plate 85 integral with the casing 65, see Fig. 11. The gear 81 is secured by screws 86 to a bevel gear 87, see Fig. 10, meshing with another bevel gear 88 of the same size rotatable on a horizontal driving shaft 89. The latter shaft is supported by the bearing 90 shown at the left of Fig. 2 and by another bearing 91 at the right of Fig. 2. These bearings have caps 92 held to the casing 65 by screws 93.

Shaft 89 is also supported by a half bearing 94 in the bearing plate 85. A cap 95 secured as at 96 to the plate 85 forms the upper bearing for the shaft 89.

A clutch collar 97 keyed as at 98 to shaft 89 has a clutch pin 99 which fits into the bevel gear 88. A driving sprocket wheel 100 is secured to the shaft 89 by a pin 101. The lower end of the chain 15 is trained around the sprocket wheel 100, and the latter as well as the sprocket wheels mounted on the mechanism K are preferably in the same plane and of the same size.

In the operation of the mechanism thus far described the top shaft 73 will rotate once for each pick of the loom and will act through the spur eccentrically mounted gears 80 and 81 and the bevel gears 87 and 88 and also the clutch collar 97 to turn the shaft 89 once for each pick of the loom. This causes a rotation of the sprocket wheel 100 for each rotation of the top shaft, and since this sprocket wheel is of the same diameter as the sprocket wheels 25 and 35 the elongated cylinder gears 7 and 8 will be rotated in opposite directions once for each pick of the loom so long as the clutch collar 97 is in the driving position shown in Fig. 2.

The bearing cap 92 for bearing 90 has a level 105 pivoted thereto as at 106 for sliding collar 97 along shaft 89. A rod 107 connected to lever 105 extends forwardly to a manually controlled lever 108. Ordinarily levers 105 and 108 will be in the position shown in Fig. 1 with the clutch 97 in driving position. If it is desired to disconnect the mechanism K from shafts 73 and 89 lever 108 will be moved forwardly or to the right as viewed in Fig. 1 to rock the lever 105 to move the clutch collar 97 to the left, Figs. 1 and 2, to move the driving pin 98 out of driving engagement with the bevel gear 88.

In order to permit a change of timing of the head mechanism K with respect to the loom top shaft 73 provision is made for moving the bevel gear 87 out of mesh with the bevel 88. For this purpose the casing 65 is provided with a horizontal stud 110 on which is pivoted a positioner or retainer 111 which when in the normal position thereof shown in full lines in Fig. 10 rests on stud 82 between the eccentrically mounted gear 81 and the bearing 83 to hold the bevel gears 87 and 88 in mesh. By swinging the retainer or positioner 111 to the dotted line position in Fig. 10 the spur gear 81 and bevel gear 87 can be slid along stud 82 in a direction away from shaft 89 a sufficient distance to permit rotation of the horizontal shaft 89 independently of rotation of the top shaft 73. In this way the sprocket 100 can be turned while the loom is at rest in order to change the setting of the cylinder gears 7 and 8 with respect to the shaft 73, if desired. The screws 86 pass through arcuate slots 112 in gear 81 which permit relative angular adjustment of the latter with respect to bevel gear 87 when the screws are loosened.

Looms employing the Knowles head shedding mechanism as already described hereinbefore are frequently made with a positive reverse worm cloth take-up mechanism and it is a further object of the present invention to adapt the mechanism already described to this type of take-up. The housing 65 has bearings 115 and 116 in which is mounted a short take-up shaft element 117 joined by a coupling 118 to the main shaft 119 of the reverse worm take-up. Shaft 119 extends forwardly, to the right in Fig. 1, and has the usual driving connection with the take-up roll not shown herein but constructed as shown for instance in Patent No. 886,871.

Secured to the short shaft element 117 between the bearings 115 and 116 is a gear member 120 having two gears 121 and 122 of the same size formed as part thereof. The shaft 89 has slidably mounted thereon and keyed thereto as at 123 a gear 125 having a hub 126 grooved as at 127 to receive a lever 128 pivoted on the cap of bearing 91. A pinion 130 is freely rotatable on a stud 131 secured to the housing 65 and meshes permanently with gear 122 but is normally out of mesh with gear 125.

Lever 128 is connected to a rod 135 extending upwardly and forwardly to a lever 136 which is a usual part of the Knowles head mechanism. This lever 136 is rocked in a clockwise direction as viewed in Fig. 1 preparatory to a pick-out operation for the purpose of reversing the pattern chain (not shown). This part of the mechanism is well-known and is not believed to require detailed description herein. A rod 138 may be used to connect levers 105 and 128 to disconnect clutch 97 from bevel gear 88 when gear 125 is meshed with pinion 130.

Under normal loom operation the parts will be in the position shown in Fig. 7 and rotation of the driving shaft 89 will cause rotation of the shaft 119 through gears 121 and 125. In the event that it is necessary to make a pick-out to correct a mispick the lever 128 will be moved by mechanism to be described to shift the gear 125 along shaft 89 out of mesh with gear 121 and into mesh with pinion 130. The latter is approximately twice as wide as the gear 122 and the latter will be driven in a reverse direction by the pinion when the shaft 89 is turned in its usual or normal direction. The effect of the reversal of gear 122 is to reverse the take-up shaft 119 so that the take-up mechanism will move the fell of the cloth backwardly in the loom to compensate for any picks which are removed from the cloth incident to the pick-out.

The horizontal shaft 89 is parallel to the short shaft element 117 and is also preferably parallel to the shaft 119, and because of this fact the driving and reversing gearing between the driving shaft 89 and the take-up shaft can be made with spur gears instead of the expensive bevel gears which have been employed heretofore. This advantage grows out of the fact that the shaft 89 is made horizontal to rotate the sprocket wheel 100 in a vertical plane, as already described.

From the foregoing it will be seen that the invention sets forth simple means for driving both the top and bottom cylinder gears 7 and 8 of a loom shedding mechanism by means of a flexible drive such as the chain trained around the loom driven sprocket wheel 100. The chain meshes with sprocket wheels 25 and 35 in such manner as to rotate the cylinder gears in opposite directions. The flexibility of the chain obviates the need for the accurate alignment of connections between the driving shaft 73 and the cylinder gears 7 and 8 which has been necessary heretofore when a rigid shaft was employed. It will also be seen that the eccentrically mounted sprocket wheel 46 provides means for taking up slack in the chain, and that the adjustment of the top sprocket wheel 25 with respect to the upper cylinder gear 7 permits compensation for any angular motion of the top cylinder gear which may accompany adjustment of the eccentrically mounted sprocket wheel. It will further be seen that the guides 60 prevent vibration of the sections 61 and 62 of the chain and can be adjusted to take up a slight amount of slack in the chain. It will also be noted that the sprocket wheel 100 which drives the chain is on a horizontal shaft parallel to the take-up shaft 117, and that the latter can be reversed by a relatively simple and inexpensive gearing employing spur gears. The shafts 82, 89 and 117 and the gearing connected to them are all mounted on the housing 65 and can be assembled on the latter and then applied as a unit to the loom. Also, the cap bearings 92 for the bearings 90 and 91 support the levers which are connected to rods 107, 135 and 138 and can be secured to the housing 65 after it has been secured to the loom. Furthermore, the retainer or positioner 111 can be swung to the dotted line position shown in Fig. 10 to permit disengagement of the bevel gears 87 and 88 should it be desired to change the time of driving shaft 89 with respect to the time of the loom shaft 73.

Having thus described the invention it will be seen that changes and modifications of the foregoing specific disclosure may be made without departing from the spirit and scope of the invention.

What is claimed as new is:

1. In shedding mechanism for a loom operating with vibrator gears, two cylinder gears to operate the vibrator gears, a driven sprocket wheel secured to each cylinder gear, a driving sprocket wheel driven by the loom, and an endless chain meshing with the sprocket wheels and effective when the driving sprocket wheel turns to rotate the driven sprocket wheels and their respective cylinder gears in opposite directions.

2. In shedding mechanism for a loom operating with vibrator gears, two spaced horizontal cylinder gears to operate the vibrator gears, a driven sprocket wheel secured to each cylinder gear, a horizontal driving shaft rotated by the loom, a driving sprocket wheel secured to the shaft, and an endless chain meshing with the sprocket wheels and effective when the shaft rotates to rotate the driven sprocket wheels and their corresponding cylinder gears in opposite directions.

3. In shedding mechanism for a loom operating with vibrator gears, two cylinder gears to operate the vibrator gears having horizontal parallel axes, a sprocket wheel secured to each cylinder gear, a horizontal driving shaft the axis of which is parallel to the axes of the cylinder gears, a driving sprocket wheel secured to the driving shaft, and an endless chain meshing with the sprocket wheels effective when the driving shaft rotates to cause the driven sprocket wheels and their corresponding cylinder gears to rotate in opposite directions.

4. In shedding mechanism for a loom operating with vibrator gears, two cylinder gears to operate the vibrator gears, a sprocket wheel secured to each cylinder gear, means enabling one of said sprocket wheels to be adjusted angularly with respect to the associated cylinder gear, a driving sprocket wheel rotating during loom operation, and an endless chain meshing with said sprocket wheels effective due to rotation of the driving sprocket wheel to turn the driven sprocket wheels and their associated cylinder gears in opposite directions.

5. In shedding mechanism for a loom operating with vibrator gears, two cylinder gears to operate the vibrator gears, a driven sprocket wheel secured to one of said cylinder gears, a second driven sprocket wheel for the other cylinder gear, collar means secured to and rotating with said other cylinder gear, means holding the second driven sprocket wheel in angularly adjusted position on the collar means, a driving sprocket wheel, and an endless chain meshing with said sprocket wheels effective when the driving sprocket wheel turns to cause rotation of the driven sprocket wheels in opposite directions.

6. In shedding mechanism for a loom operating with vibrator gears, a cylinder gear for the vibrator gears, a sprocket wheel secured to said cylinder gear, a second cylinder gear also for the vibrator gears, collar means secured to and rotating with the second cylinder gear and having a conical part, a second driven sprocket wheel fitting the conical portion of said collar means, means holding the second sprocket wheel on said conical part in angularly adjusted position with respect to the collar means, a driving sprocket wheel, and an endless chain meshing with said sprocket wheels effective when the driving sprocket wheel rotates to cause the driven sprocket wheels and the cylinder gears connected thereto to rotate in opposite directions.

7. In shedding mechanism for a loom operating with vibrator gears, two cylinder gears to operate the vibrator gears, a driven sprocket wheel secured to one of said cylinder gears, a collar keyed with respect to and rotating with the other cylinder gear and formed with a conical part, a second driven sprocket wheel fitting the conical part of the collar means and formed with arcuate slots, securing means extending through said arcuate slots into the collar means forcing the second driven sprocket wheel against said conical part and holding said second sprocket wheel in angularly adjusted position with respect to the collar means, a driving sprocket wheel, and an endless chain meshing with said sprocket wheels effective when the driving sprocket wheel rotates to rotate the driven sprocket wheels and their corresponding cylinder gears in opposite directions.

8. In shedding mechanism for a loom operating with vibrator gears, two cylinder gears to operate the vibrator gears, a sprocket wheel secured to each cylinder gear, a driving sprocket wheel, a chain meshing with the sprocket wheels effective when the driving sprocket wheel rotates to cause the driven sprocket wheels and their associated cylinder gears to rotate in opposite directions, a slack take-up sprocket wheel meshing with the chain, and an eccentric mounting for said slack take-up sprocket wheel capable of holding the latter in adjusted position with respect to the driven sprocket wheels to take up slack in the chain.

9. In shedding mechanism for a loom operating with vibrator gears, two cylinder gears for the vibrator gears, a sprocket wheel secured to each cylinder gear, a driving sprocket wheel rotating during loom operation, a chain meshing with the sprocket wheels effective when the driving sprocket wheel is rotating to rotate the driven sprocket wheels and their associated gears in opposite directions, a slack take-up sprocket wheel meshing with said chain, an eccentric mounting for the slack take-up sprocket wheel on which the latter is freely rotatable, and means holding the eccentric mounting in angularly adjusted position with respect to the loom to locate the take-up sprocket wheel in a position to take up slack in the chain.

10. The structure set forth in claim 9 wherein said means comprises a stud having a conical head fitting a correspondingly formed part of the loom and clamping means on said stud forcing the eccentric against said part of the loom.

11. In shedding mechanism for a loom operating with vibrator gears, two cylinder gears to operate the vibrator gears, a driving sprocket wheel rotating during loom operation, a driven sprocket wheel secured to one of said cylinder gears, a second driven sprocket wheel for the other cylinder gear, means holding said second sprocket wheel on said other cylinder gear in angularly adjusted position with respect to the latter, a slack take-up sprocket wheel, an endless chain meshing with said sprocket wheels effective when the driving sprocket wheel is rotating to rotate said driven sprocket wheels and their associated cylinder gears in opposite directions, and means mounting the slack take-up sprocket wheel for movement relative to the driven sprocket wheels to take up slack in the chain.

12. The structure set forth in claim 11 wherein said slack take-up sprocket wheel is located intermediate the driven sprocket wheels and engages that part of the chain extending from one of said driven sprocket wheels to the other driven sprocket wheel.

13. In shedding mechanism for a loom operating with vibrator gears, a pair of cylinder gears to operate the vibrator gears rotatable about vertically spaced horizontal parallel axes, a driving shaft rotatable about a horizontal axis parallel to said axes, a driven sprocket wheel secured to each cylinder gear, a driving sprocket wheel secured to the driving shaft, an endless chain meshing with said sprocket wheels, a loom shaft, and operative connections between the loom and driving shafts effective when the loom is operating to rotate the driving shaft and the driving sprocket wheel, said chain effective during rotation of the driving sprocket wheel to rotate the driven sprocket wheels and their associated cylinder gears in opposite directions.

14. In shedding mechanism for a loom operating with vibrator gears, a loom shaft, a driving shaft for the shedding mechanism, cylinder gears for the vibrator gears, an endless chain operatively connecting the driving shaft and the cylinder gears effective to rotate the latter in opposite directions when the driving shaft rotates, two meshing spur gears one of which is secured to the loom shaft, and two meshing bevel gears one of which is secured to the other of said spur gears, the other of said bevel gears having driving relation with respect to the driving shaft.

15. In shedding mechanism for a loom operating with vibrator gears, a loom shaft, a driving shaft for the shedding mechanism, cylinder gears for the vibrator gears, an endless chain operatively connecting the driving shaft and the cylinder gears effective to rotate the latter in opposite directions when the driving shaft rotates, two meshing spur gears one of which rotates with the loom shaft, means mounting the other spur gear for rotation, and a pair of normally meshing bevel gears one of which is mounted on said means and is secured to said other spur gear, the other bevel gear having driving relation with respect to the driving shaft.

16. The structure set forth in claim 15 wherein said other spur gear and said one bevel gear are slidable on said means to move said one bevel gear out of mesh with said other bevel gear to permit relative rotation of said other bevel gear with respect to said spur gears.

17. In shedding mechanism for a loom operating with vibrator gears, a loom shaft, a driving shaft for the shedding mechanism, cylinder gears for the vibrator gears, an endless chain operatively connecting the driving shaft and the cylinder gears effective to rotate the latter in opposite directions when the driving shaft rotates, a pair of meshing spur gears one of which rotates with the loom shaft, a bevel gear secured to the other spur gear in angularly adjusted position relative thereto, a second bevel gear having driving relation with respect to the driving shaft, means mounting said other spur gear and the first named bevel gear for sliding motion to move the first named bevel gear out of mesh with the second bevel gear to permit turning of the bevel gears relative to each other, and a retainer normally effective to hold the bevel gears in mesh with each other but movable to permit said sliding movement of the other spur gear in a direction to unmesh said bevel gears.

18. In shedding mechanism for a loom operating with vibrator gears, two cylinder gears for the vibrator gears, a sprocket wheel secured to each cylinder gear, a driving sprocket wheel rotating during loom operation, a chain meshing with said sprocket wheels having two sections extending from the driving sprocket wheel toward the driven sprocket wheels, said chain causing the driven sprocket wheels to rotate in opposite directions when the driving sprocket wheel rotates, and anti-vibration means mounted on the loom and engaging each of said sections of chain.

19. The structure set forth in claim 18 wherein said anti-vibration means include two elements movable with respect to each other in a direction transverse of said sections to take up slack in the chain.

20. In shedding mechanism for a loom operating with cylinder gears, a sprocket wheel secured to each cylinder gear, an endless chain meshing with the sprocket wheels, a housing stationary with respect to the loom, a driving shaft rotatably mounted on the housing, a driving sprocket wheel secured to the driving shaft and meshing with said chain, the latter effective when the driving sprocket wheel rotates to drive said cylinder gears in opposite directions, a loom shaft, and gearing supported by said housing intermediate the loom and driving shafts effective to rotate the latter when the loom shaft rotates incident to loom operation.

21. In shedding mechanism for a loom operating with cylinder gears, a sprocket wheel secured to each cylinder gear, an endless chain meshing with the sprocket wheels, a housing stationary with respect to the loom, a driving shaft rotatably mounted on the housing, a driving sprocket wheel secured to the driving shaft and meshing with said chain, the latter effective when the driving sprocket wheel rotates to drive said cylinder gears in opposite directions, a loom shaft, and gearing supported by said housing intermediate the loom and driving shafts effective to rotate the latter when the loomshaft rotates incident to loom operation, a clutch rotating with the driving shaft movable into and out of driving relation with respect to the gearing, and a lever mounted on said housing operatively connected to the clutch effective to move the latter into and out of driving relation with respect to the gearing.

22. In shedding mechanism for a loom having a frame and operating with cylinder gears rotating about horizontal parallel axes, a driven sprocket wheel secured to each cylinder gear, a chain meshing with said driven sprocket wheel, a housing fixed with respect to the loom frame, a shaft rotatably mounted on the housing to rotate about a horizontal axis parallel to the axes of the cylinder gears, a loom shaft, gearing for the driving shaft supported by said housing, a clutch rotating with the driving shaft movable into and out of driving relation with respect to said gearing, a control lever for the clutch pivotally mounted on the housing and effective to move the clutch into and out of driving relation with respect to the gearing, and a driving sprocket wheel secured to said driving shaft and meshing with said chain, the latter effective when said driving shaft is rotating to rotate said cylinder gears in opposite directions.

23. In a loom having a frame and operating with a cloth take-up mechanism shaft and having shedding mechanism including two cylinder gears, a driven sprocket wheel secured to each cylinder gear, a housing fixed with respect to the loom frame, a driving shaft for the cylinder gears rotatable in said housing, a sprocket wheel secured to the driving shaft, a chain meshing with said sprocket wheels, and gearing supported by said housing operatively connecting the take-up mechanism shaft to said driving shaft.

24. In a loom having a frame and operating with a cloth take-up mechanism shaft and having shedding mechanism including two cylinder gears, a driven sprocket wheel secured to each cylinder gear, a housing fixed with respect to the loom frame, a driving shaft for the cylinder gears rotatable in said housing, a sprocket wheel secured to the driving shaft, a chain meshing with said sprocket wheels, a take-up shaft element rotatable on the housing and operatively connected to the take-up mechanism shaft, and gearing supported by the housing operatively connecting the driving shaft and said take-up shaft element.

25. In a loom having a frame and operating with a cloth take-up mechanism shaft and having shedding mechanism including two cylinder gears, a driven sprocket wheel secured to each cylinder gear, a housing fixed with respect to the loom frame, a driving shaft for the cylinder gears rotatable in said housing, a sprocket wheel secured to the driving shaft, a chain meshing with said sprocket wheels, a take-up shaft element mounted for rotation on the housing and operatively connected to the take-up mechanism shaft, reversible gear driving means operatively interposed between the driving shaft and said take-up shaft including a gear slidable on the driving shaft effective in one position to cause the take-up shaft element to turn in a given direction due to rotation of the driving shaft and effective in another position to cause reverse rotation of the take-up shaft element.

WILLIAM A. BLANCHARD.

References Cited in the file of this patent

UNITED STATES PATENTS

| Number | Name | Date |
| --- | --- | --- |
| 2,421,539 | Clarke | June 3, 1947 |